US009553692B2

(12) United States Patent
Yoo et al.

(10) Patent No.: US 9,553,692 B2
(45) Date of Patent: Jan. 24, 2017

(54) METHOD AND SYSTEM FOR DETERMINING AND CONTROLLING POWER OF OPTICAL TRANSMITTER OF OPTICAL NETWORK UNIT FOR TIME AND WAVELENGTH DIVISION MULTIPLEXING PASSIVE OPTICAL NETWORK

(71) Applicant: ELECTRONICS AND TELECOMMUNICATIONS RESEARCH INSTITUTE, Daejeon (KR)

(72) Inventors: Hark Yoo, Gwangju (KR); Dong Soo Lee, Seongnam-si (KR); Geun Yong Kim, Gwangju (KR); Sung Chang Kim, Gwangju (KR); Hee Do Kim, Seoul (KR); Jae In Kim, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 54 days.

(21) Appl. No.: 14/689,650

(22) Filed: Apr. 17, 2015

(65) Prior Publication Data

US 2015/0318928 A1  Nov. 5, 2015

(30) Foreign Application Priority Data

Apr. 30, 2014 (KR) .................. 10-2014-0052406

(51) Int. Cl.
*H04B 10/08* (2006.01)
*H04J 14/08* (2006.01)
(Continued)

(52) U.S. Cl.
CPC ......... *H04J 14/08* (2013.01); *H04B 10/07953* (2013.01); *H04B 10/07955* (2013.01);
(Continued)

(58) Field of Classification Search
CPC ................... H04B 10/07955; H04B 10/07953; H04B 10/564; H04B 10/0775; H04B 10/0773; H04B 10/0779; H04B 10/272; H04B 10/07995; H04J 14/08; H04J 14/0221; H04J 14/0267; H04J 14/0282; H04Q 11/0067
(Continued)

(56) References Cited

U.S. PATENT DOCUMENTS

| 8,139,937 B2 | 3/2012 | Kim et al. |
| 8,655,166 B2 * | 2/2014 | Soto ..................... H04B 10/071 398/100 |

(Continued)

FOREIGN PATENT DOCUMENTS

KR   10-2013-0085461 A   7/2013

OTHER PUBLICATIONS

By Hark Yoo et al, "ONU Transmit Power Levelling for TWDM-PONs", COIN 2014 conference, Apr. 22, 2014.

*Primary Examiner* — Hibret Woldekidan
(74) *Attorney, Agent, or Firm* — Rabin & Berdo, P.C.

(57) ABSTRACT

Disclosed are a method and system for determining and controlling power of an optical transmitter of an optical network unit (ONU) for a time and wavelength division multiplexing passive optical network (TWDM-PON). The system includes an RSSI collector configured to collect received signal strength indication (RSSI) information from upstream optical signals received from the ONUs connected to optical line terminal (OLT) ports, an ONU power level determiner configured to gather the pieces of RSSI infor-
(Continued)

mation about the ONUs from the RSSI collector, and to determine power of optical transmitters of the ONUs based on the gathered information, and a power mode controller configured to receive power mode setting information of the optical transmitters of the ONUs from the ONU power level determiner, and to generate a physical layer operation and maintenance (PLOAM) message to control power modes of the ONUs based on the received power mode setting information.

16 Claims, 8 Drawing Sheets

(51) Int. Cl.
    *H04B 10/564* (2013.01)
    *H04B 10/079* (2013.01)
    *H04J 14/02* (2006.01)
(52) U.S. Cl.
    CPC ........ *H04B 10/564* (2013.01); *H04J 14/0221* (2013.01); *H04J 14/0267* (2013.01); *H04J 14/0282* (2013.01)
(58) Field of Classification Search
    USPC .......... 398/25, 38, 34, 35, 47, 70–72, 24, 75
    See application file for complete search history.

(56) References Cited

U.S. PATENT DOCUMENTS

| | | | |
|---|---|---|---|
| 2003/0128989 A1* | 7/2003 | Gilon | H04B 10/564 398/195 |
| 2007/0127923 A1 | 6/2007 | Dalton et al. | |
| 2008/0056714 A1 | 3/2008 | Konstan | |
| 2012/0020662 A1* | 1/2012 | Ding | H04B 10/0773 398/38 |
| 2012/0045201 A1* | 2/2012 | Skubic | H04B 10/272 398/38 |
| 2012/0141139 A1* | 6/2012 | Bakhru | H04B 10/272 398/158 |
| 2012/0144214 A1 | 6/2012 | Lee et al. | |
| 2013/0004172 A1* | 1/2013 | Sugawa | H04J 3/1694 398/72 |
| 2013/0148962 A1* | 6/2013 | Heimbuch | H04B 10/0799 398/38 |
| 2014/0010529 A1* | 1/2014 | Shin | H04Q 11/0067 398/2 |
| 2014/0056582 A1* | 2/2014 | Roberts | H04B 10/07955 398/20 |
| 2014/0233944 A1* | 8/2014 | Vetter | H04J 14/0282 398/34 |
| 2015/0381306 A1* | 12/2015 | Wu | H04B 10/0773 398/67 |

* cited by examiner

FIG. 8

| Octet | Field | Description |
|---|---|---|
| 1-2 | ONU-ID | Directed or broadcast ONU-ID. As a broadcast message, ONU-ID = 0x03FF. |
| 3 | TBD | Message type ID "Change_Power_Level". |
| 4 | SeqNo | Unicast or broadcast PLOAM sequence number, as appropriate. |
| 5 | 0000 0PPP | PPP - Power Mode Control.<br>PPP = "000" : Change to power Mode 0 (Normal).<br>PPP = "001" : Change to power Mode 1 (Normal - 3 dB).<br>PPP = "010" : Change to power Mode 2 (Normal - 6 dB).<br>PPP = "011" : Change to power Mode 3 (Normal - 9 dB).<br>PPP = "100" : Change to power Mode 4 (Normal - 12 dB).<br>PPP = "101","110","111" : Reserved (No Action). |
| 6-40 | Padding | Set to 0x00 by the transmitter; treated as "don't care" by the receiver. |
| 41-48 | MIC | Message integrity check. |

METHOD AND SYSTEM FOR DETERMINING AND CONTROLLING POWER OF OPTICAL TRANSMITTER OF OPTICAL NETWORK UNIT FOR TIME AND WAVELENGTH DIVISION MULTIPLEXING PASSIVE OPTICAL NETWORK

CROSS-REFERENCE TO RELATED APPLICATION

This application claims priority to and the benefit of Korean Patent Application No. 2014-0052406, filed on Apr. 30, 2014, the disclosure of which is incorporated herein by reference in its entirety.

BACKGROUND

1. Field of the Invention

The present invention relates to a passive optical network (PON), and more particularly, to a method and system for determining and controlling output power of an optical transmitter of an optical network unit (ONU) in a time and wavelength division multiplexing passive optical network (TWDM-PON).

2. Discussion of Related Art

With the development of optical communication technologies and a rapid increase in the demand on Internet services, fundamental researches on optical network have been conducted since the early 2000s. As a result, broadband networks, such as Fiber To The Home (FTTH) and Fiber To The Office (FTTO), have emerged and become common, in which the broadband network directly connects a base station or a central office (CO) to a subscriber using optical fibers.

In addition, numerous researches have been recently conducted on technologies of the next generation high-speed and high-capacity optical network to cope with an explosive increase in traffic according to proliferation of mobile IP terminals, such as a smart phone or a table computer, commercialization of IPTV services, and proliferation of multimedia broadcasting/streaming services over the Internet.

As a method of effectively providing services to more subscribers based on limited network resources, a Time Division Multiplexing (TDM) method and a Wavelength Division Multiplexing (WDM) method have been applied to the optical network technology. In addition, many researches have been conducted on an optical network using a hybrid method to which the TDM method and the WDM method are applied together.

Among them, by using a time and wavelength division multiplexing (TWDM) optical network technology belonging to the hybrid method to which the TDM method and the WDM method are applied together, a consistent demand on extension of a network bandwidth may be satisfied, and a communication capacity and the number of subscribers may be easily increased while a high-speed communication service is provided to a large number of subscribers. Accordingly, a great amount of researches have been conducted on the TWDM optical network technology serving as a candidate for the next generation optical network following the 10G-passive optical network technology.

Meanwhile, according to the International Telecommunication Union Telecommunication Standardization sector (ITU-T) for standardization of optical networks, a TWDM PON technology and a point-to-point WDM technology are selected as primary technologies of the NG-PON2 (40-Gigabit-capable passive optical networks), and standardization thereof is in progress.

SUMMARY OF THE INVENTION

The present invention is directed to a method and system for determining and controlling power of optical transmitters of ONUs connected to OLT ports to reduce signal quality degradation due to a crosstalk between TWDM-PON channels.

Additional aspects of the invention will be set forth in part in the description which follows and, in part, will be obvious from the description, or may be learned by practice of the invention.

According to an aspect of the present invention, there is provided a system for determining and controlling power of an optical transmitter of an optical network unit (ONU) provided for a time and wavelength division multiplexing passive optical network (TWDM-PON) system, the system including an RSSI collector, an ONU power level determiner and a power mode controller. The RSSI collector may be configured to collect received signal strength indication (RSSI) information from upstream optical signals received from the ONUs connected to optical line terminal (OLT) ports. The ONU power level determiner may be configured to gather the pieces of RSSI information about the ONUs from the RSSI collector, and to determine power of optical transmitters of the ONUs based on the gathered information. The power mode controller may be configured to receive power mode setting information of the optical transmitters of the ONUs from the ONU power level determiner, and to generate a physical layer operation and maintenance (PLOAM) message to control power modes of the ONUs based on the received power mode setting information.

According to an aspect of the present invention, there is provided a method for determining and controlling power of an optical transmitter of an optical network unit (ONU) provided for a time and wavelength division multiplexing passive optical network (TWDM-PON) system, the method including: collecting received signal strength indication (RSSI) information from upstream optical signals received from the ONUs connected to optical line terminal (OLT) ports; gathering, the pieces of RSSI information about the ONUs from the OLT ports, and determining power of optical transmitters of the ONUs based on the gathered information; transmitting determined power mode setting information of the optical transmitters of the ONUs to the OLT ports; and generating a physical layer operation and maintenance (PLOAM) message to control power modes of the ONUs based on the power mode setting information of the optical transmitter, and transmitting the PLOAM message to the ONUs from the OLT ports.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 8 is a diagram illustrating an example of details of a PLOAM message according to exemplary embodiments of the present invention.

DETAILED DESCRIPTION OF EXEMPLARY EMBODIMENTS

Figure 1:
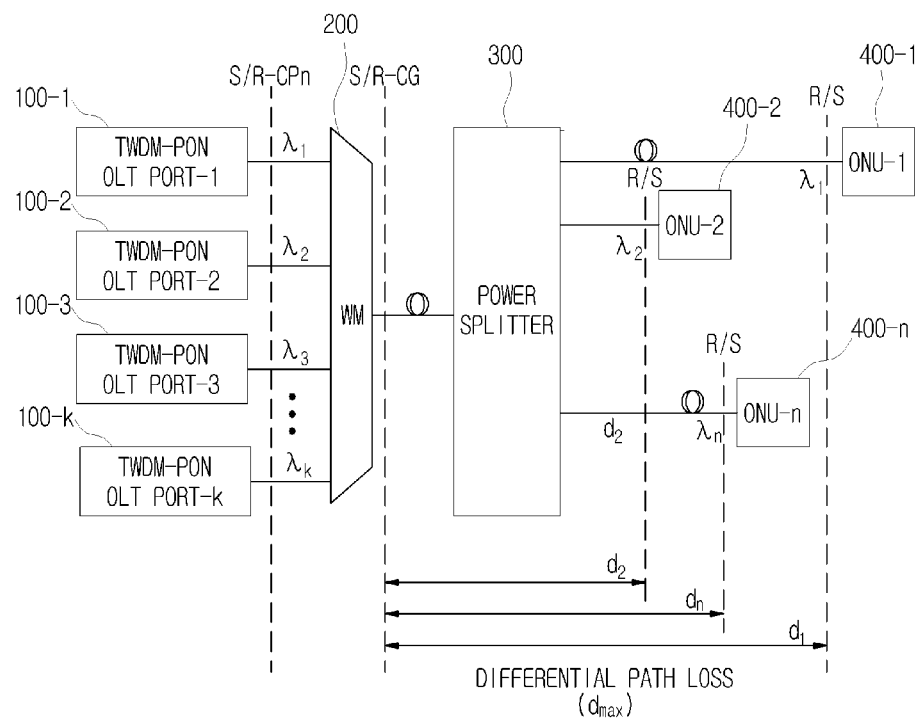
FIG. 1 is a block diagram illustrating a configuration of a TWDM-PON system to which a method and system for controlling power of an optical transmitter of an ONU according to exemplary embodiments of the present invention are applied.

The above and other advantages, and a scheme for the advantages of the present invention will become readily apparent by reference to the following detailed description when considered in conjunction with the accompanying drawings. However, the scope of the present invention is not limited to such embodiments and the present invention may be realized in various forms. The embodiments to be described below are nothing but the ones provided to bring the disclosure of the present invention to perfection and assist those skilled in the art to completely understand the present invention. The present invention is defined only by the scope of the appended claims. Meanwhile, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail below with reference to the accompanying drawings. The same reference numerals are used to designate the same elements throughout the drawings Descriptions of well-known functions and structures are omitted to enhance clarity and conciseness.

Time and Wavelength Division Multiplexing Passive Optical Network, hereinafter, referred to as TWDM-PON uses wavelengths of four or eight channels for upstream/downstream, and a TDM scheme is applied to each wavelength. An Optical Line Terminal (hereinafter, referred to as ONT) uses one channel for upstream and one channel for downstream, and an Optical Network Unit (hereinafter, referred to as an ONU) selects an OLT, to which the ONU belongs, and performs upstream/downstream transmission by using a tunable optical receiver and a tunable optical transmitter.

FIG. 1 is a block diagram illustrating a configuration of a TWDM-PON system to which a method and system for controlling power of an optical transmitter of an ONU according to exemplary embodiments of the present invention are applied.

Referring to FIG. 1, OLT ports 100-1, 100-2, 100-3, . . . and 100-k have a wavelength demultiplexer WM 200 at front ends thereof to receive optical signals of different wavelengths for upstream transmission. According to exemplary embodiments of the present invention, the wavelength demultiplexer WM 200 is implemented using an Arrayed Waveguide Grating (hereinafter referred to as AWG), and in addition to that, may be implemented using a thin-film filter method.

The upstream data transmission from ONUs 400-1, 400-2, . . . and 400-n to the OLT is achieved along the following paths. First, the ONUs 400-1, 400-2, . . . and 400-n transmit data with upstream wavelengths of TWDM channels to which the ONUs 400-1, 400-2, . . . and 400-n belong, respectively. The transmitted data are joined by a power splitter 300, and transmitted in the form of an optical signal to the wavelength demultiplexer 200 at the front end of the OLT. The wavelength demultiplexer 200 demultiplexes the optical signals according to wavelengths, and transmits optical signals of wavelengths to OLT ports 100-1, 100-2, 100-3, . . . and 100-k.

In this case, a specific OLT port 100-1 may receive an optical signal of another wavelength whose magnitude is reduced by an isolation value of the wavelength demultiplexer 200, as well as an optical signal of a wavelength to be received. Accordingly, the OLT port may have a crosstalk due to an optical signal of a channel different from a reception channel, which is referred to as an inter-channel crosstalk.

Meanwhile, as an optical signal is transmitted from the ONUs 400-1, 400-2, . . . and 400-n to the power splitter 300, the optical signal may have a path loss due to an optical path, a connection loss at an optical connection point, and an insertion loss due to an additional multistage power splitter. Such a loss occurring in the course of transmission may be determined by the location and environment in which the ONUs 400-1, 400-2, . . . and 400-n are installed, and the ONUs 400-1, 400-2, . . . and 400-n may have different losses. ITU-T G987.2 XG-PON PMD standards regulates the difference in transmission loss to be 15 dB at the maximum, and the regulation may be also applied to NG-PON2 PMD specification. In addition, the standards are defined to allow a wavelength tunable optical transmitter of an ONU to have a power deviation within 5 dB.

The above-described inter-channel crosstalk occurring in the wavelength demultiplexer 200 of the front end of the OLT port may reach a considerable level, in consideration of the maximum transmission loss difference between the ONUs 400-1, 400-2, . . . , 400-n (for example, 15 dB at the maximum) and the power deviation of the wavelength tunable optical transmitter of the ONU (for example, 5 dB). Accordingly, the transmission quality is also seriously degraded.

Figure 2:
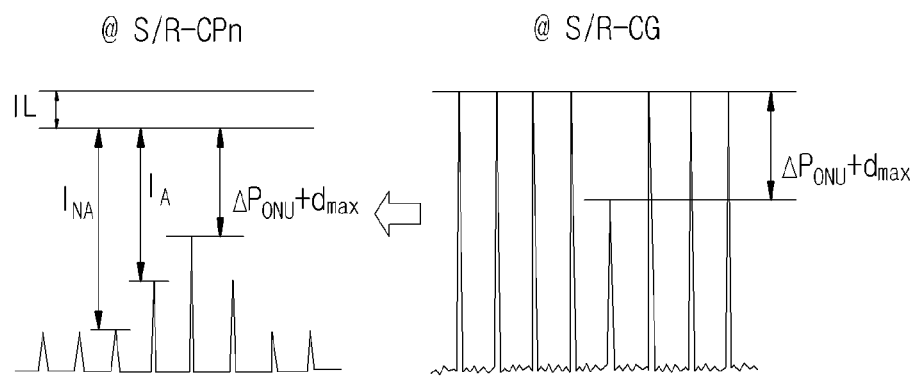
FIG. 2 is a diagram illustrating a change in the optical signal intensity of each upstream channel before and after passing through a wavelength demultiplexer according to exemplary embodiments of the present invention.

FIG. 2 is a diagram illustrating a change in the optical signal intensity of each upstream channel before and after passing through a wavelength demultiplexer according to exemplary embodiments of the present invention.

Referring to FIG. 2, it is shown that not only a channel to be received but also signals of other channels are received according to adjacent channel isolation and non-adjacent channel isolation of the wavelength demultiplexer 200. The differences in the optical signal intensities between the channel to be received and other channels are determined by output power of an ONU, a pass loss, and isolation of a wavelength demultiplxer.

In FIG. 2, "S/R-CG" represents a point of time before optical signals of upstream channels pass through the wavelength demultiplexer 200, and "S/R-CPn" represents at point of time after the optical signals of upstream channels pass through the wavelength demultiplexer 200.

At a point of "S/R-CG", deviation in the intensities of optical signals of the upstream channels is determined by power deviation of the optical transmitters of the ONUs $\Delta P_{ONU}$ and transmission path loss (differential path loss), $d_{max}$.

At a point of "S/R-CPn", the deviation in intensities of optical signals of the upstream channels is determined by power deviation of the optical transmitters of the ONUs $\Delta P_{ONU}$, the transmission path loss (differential path loss) $d_{max}$, and isolation values $I_A$ and $I_{NA}$ of the wavelength demultiplexer 200.

The following description will be made on an inter-channel crosstalk and power loss that may occur at upstream transmission of an ONU of a TVs/DM-PON system in a worst case. It is assumed that four or eight channels are used, an ONU of interest experiences a transmission loss of 15 dB at the most, and transmits power smaller than other ONUs by 5 dB. The other ONUs are assumed to experience a transmission loss of 0 dBm and have a transmission power greater than the ONU by 5 dB.

Table 1 shows calculation values of an inter-channel crosstalk occurring in an upstream transmission of an ONU in the worst case, and a power loss according to the inter-channel crosstalk.

TABLE 1

| Worst case design approach | | Typical AWG $I_A$ = 23 dB $I_{NA}$ = 30 dB | Filter with Tight spec $I_A$ = 26 dB $I_{NA}$ = 33 dB | Cascaded Filter $I_A$ = 32 dB $I_{NA}$ = 36 dB |
|---|---|---|---|---|
| 4 ch. System | $C_c$(dB) | 0.4 | −2.6 | −8.2 |
|  | $P_c$(dB) | Infinite | Infinite | 0.47 |
| 8 ch. System | $C_c$(dB) | 1.8 | −1.2 | −6.0 |
|  | $P_c$(dB) | Infinite | Infinite | 0.57 |

Referring to Table 1, it can be seen that when a general AWG is used as a wavelength demultiplexer, an infinite power loss occurs due to an inter-channel crosstalk, and when a cascaded filter having superior isolation is used, a power loss of 1 dB or less is shown.

According, as a method of reducing a power loss due to an inter-channel crosstalk, a cascaded filter having superior isolation may be used. However, the cascaded filter is not easy to implement and thus increases the manufacturing cost.

Another method of reducing an inter-channel crosstalk may be implemented in such a way that the magnitudes of optical signals received by a wavelength demultiplexer from ONUs of channels are limited within a predetermined range by adjusting power of an optical transmitter of an ONU. The method and system for controlling power of an optical transmitter of an ONU according to an exemplary embodiment of the present invention provides an inventive concept for determining and controlling power of optical transmitters of ONUs connected to OLT ports.

Figure 3:
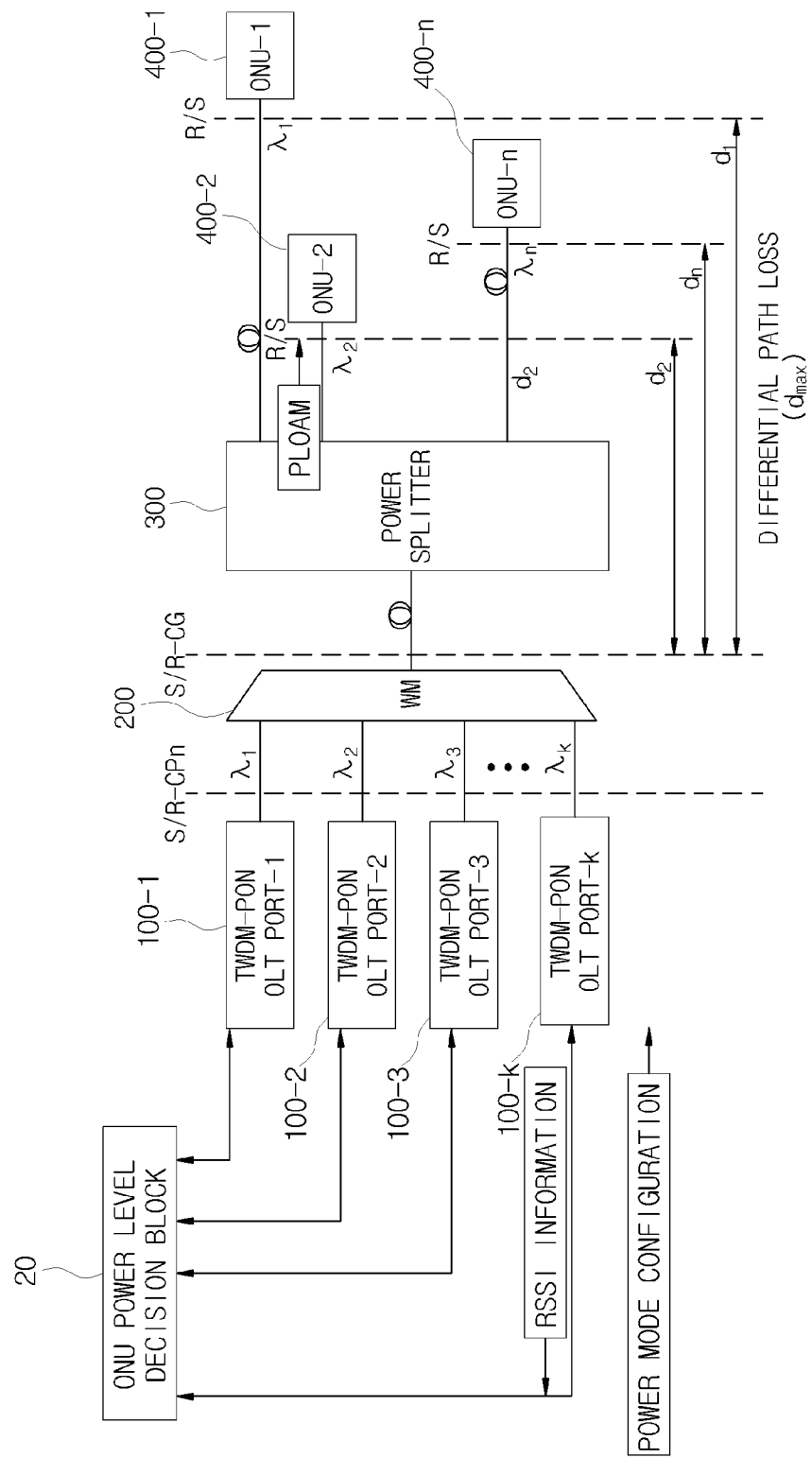
FIG. 3 is a block diagram illustrating a TWDM-PON system including a system for controlling power of an optical transmitter of an ONU according to exemplary embodiments of the present invention.
Figure 4:
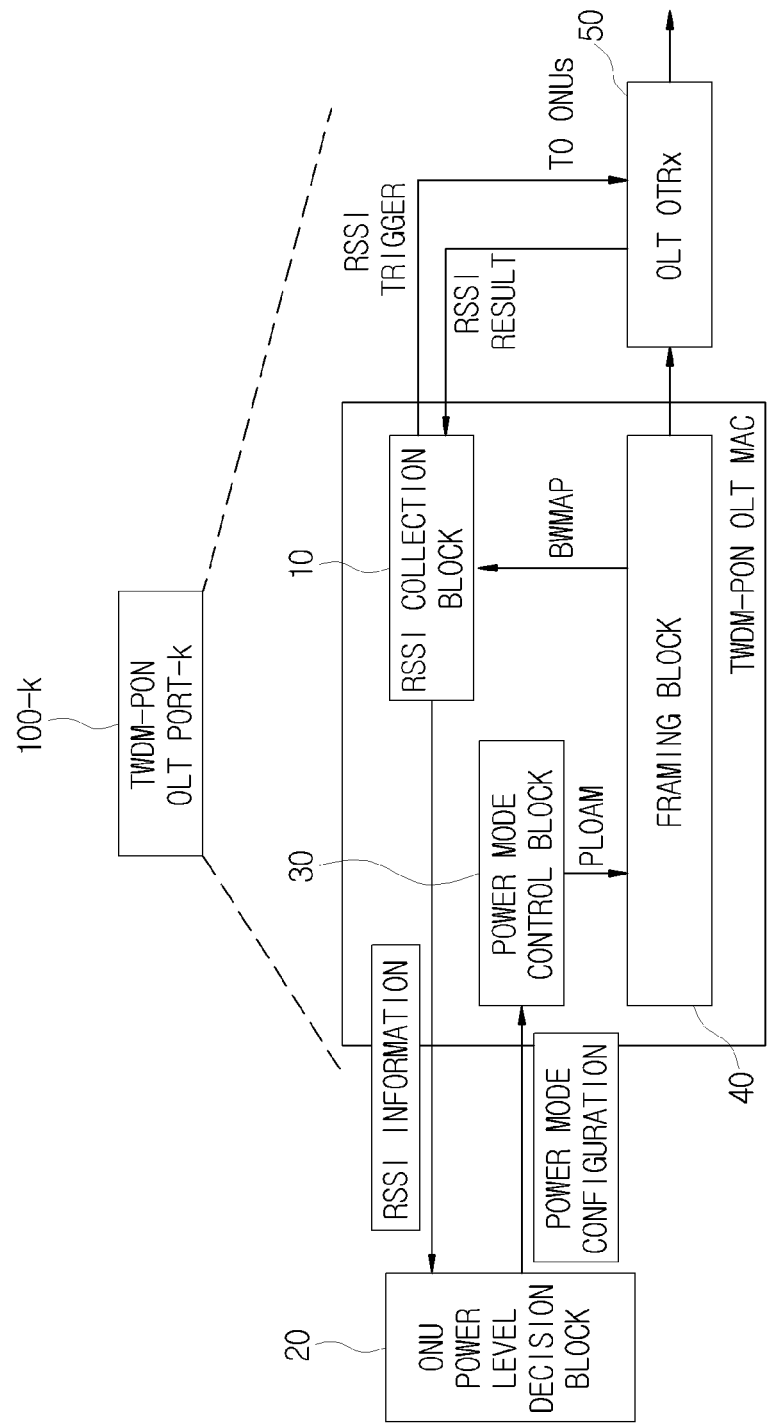
FIG. 4 is a block diagram illustrating an internal configuration of an OLT in a TWDM-PON system including a system for controlling power of an optical transmitter of an ONU according to exemplary embodiments of the present invention.

FIG. 3 is a block diagram illustrating a TWDM-PON system including a system for controlling power of an optical transmitter of an ONU according to exemplary embodiments of the present invention, and FIG. 4 is a block diagram illustrating an internal configuration of an OLT in a TWDM-PON system including a system for controlling power of an optical transmitter of an ONU according to exemplary embodiments of the present invention.

Referring to FIGS. 3 and 4, a system for controlling power of an optical transmitter of an ONU according to an exemplary embodiment of the present invention includes an RSSI collector 10, an ONU power level determiner 20 and a power mode controller 30.

The RSSI collector 10 collects received signal strength indication (RSSI) information from upstream optical signals received from ONUs 400-1, 400-2 . . . and 400-n connected to optical line terminal (OLT) ports 100-1, 100-2, 100-3 . . . and 100-k included in the TWDM-PON system.

According to an exemplary embodiment, the RSSI collector 10 is implemented inside the OLT port 100-k of the TWDM-PON system to collect RSSI information for each of the ONUs connected to the OLT port 100-k using an RSSI measurement function of an OLT optical module 50. For this, the RSSI collector 10 sends the OLT optical module 50 a trigger signal for RSSI measurement at a time of arrival of a burst frame for each for the ONUs received upstream.

In this case, the RSSI collector 10 may predict an arrival interval of an upstream burst frame for each of the ONUs using an upstream bandwidth map BWmap generated in a framing block 40 of a TWDM-PON OLT MAC.

Figure 5:
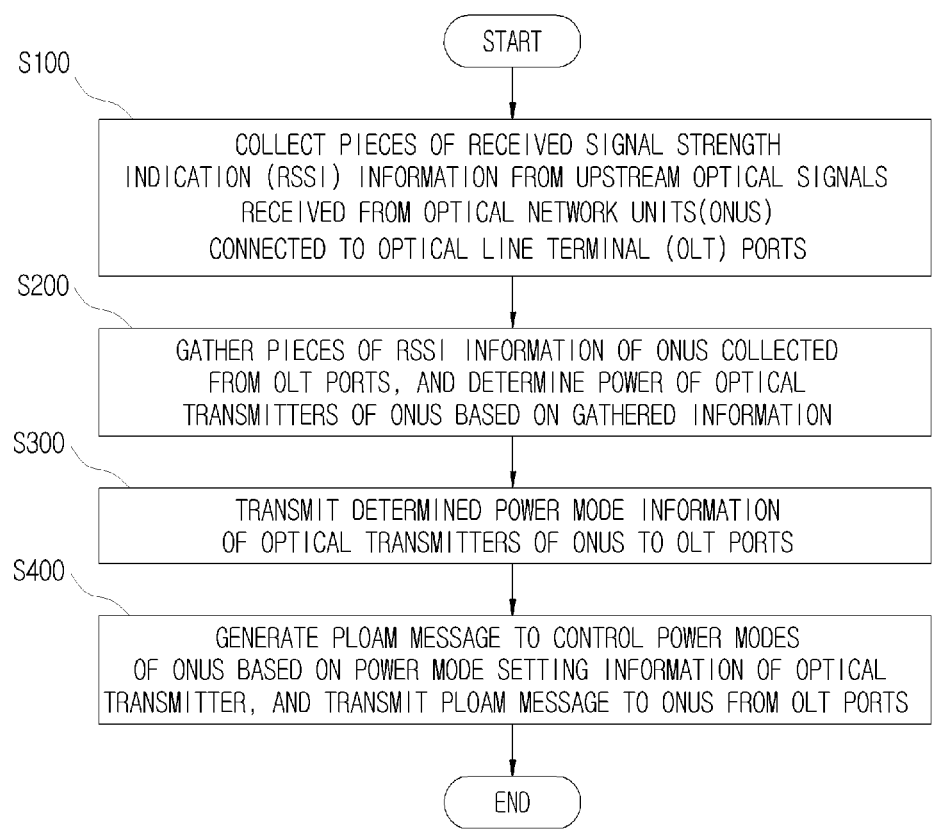
FIG. 5 is a flowchart showing a method for controlling power of an optical transmitter of an ONU according to exemplary embodiments of the present invention.

According to another exemplary embodiment, the RSSI collector 10 may predict a time of arrival of a burst frame of each ONU transmitted upstream using a signal detect signal about an upstream burst, the signal detect signal output by the OLT optical module 50 in a ranging process performed during an activation of the ONU. FIG. 5 illustrates a process in which an arrival interval of upstream burst frame of each ONU is predicted using BWmap of the former as an example.

Meanwhile, the OLT optical module 50 having received a trigger signal for RSSI measurement from the RSSI collector 10 measures intensities of reception optical signals during a trigger signal interval, and stores a result of the measurement in a memory of the OLT optical module 50. The RSSI collector 10 reads the result stored in the memory of the OLT optical module 50 and records the result together with ONU-ID information corresponding to the record. The pieces of recorded RSSI information about the ONUs are transmitted to the ONU power level determiner 20.

The ONU power level determiner 20 gathers the pieces of the RSSI information about the ONUs from the RSSI collector 10, and to determine power of optical transmitters of the ONUs based on the gathered information.

According to an exemplary embodiment, the ONU power level determiner 20 is implemented outside the OLT port 100-k, and collects RSSI information about activated ONUs from the RSSI collector 10 of the OLT port 100-k. The collected RSSI information includes a channel number identifying a corresponding OLT port 100-k, a ONU-ID identifying a corresponding ONU (400-n), a measured RSSI value, and current power mode information of a ONU 400-n.

Meanwhile, before a method of the ONU power level determiner 20 determining power modes of optical transmitters of the ONUs 400-1, 400-2 . . . and 400-n is described, a power mode of an ONU may be defined as follows.

For example, the ONU optical transmitter may have five power modes, i.e., power modes 0 to 4. Power mode 0 represents initial setting power of an optical transmitter. That is, power mode 0 has a certain value in a range of +4 dBm and +9 dBm mentioned in ITU-T G989.2 PMD specifications, and power mode 0 may be different at each optical transmitter.

Power mode 1 represents power obtained by reducing from power mode 0 of initial setting power by 3 dB. Accordingly, when output of power mode 0 is +9 dBm, power mode 1 is +6 dBm, a value obtained by reducing from +9 dBm by 3 dB. Similarly, power mode 2 represents power obtained by reducing from initial setting power by 6 dB, and power modes 3 and 4 represent powers obtained by reducing from initial setting power by 9 dB and 12 dB, respectively. The power modes each have a different of 3 dB therebetween. For convenience sake of description, the output difference between power modes is assumed to 3 dB, but the deviation of power modes is not limited thereto, and may be provided to have various values depending on the setting.

Figure 6:
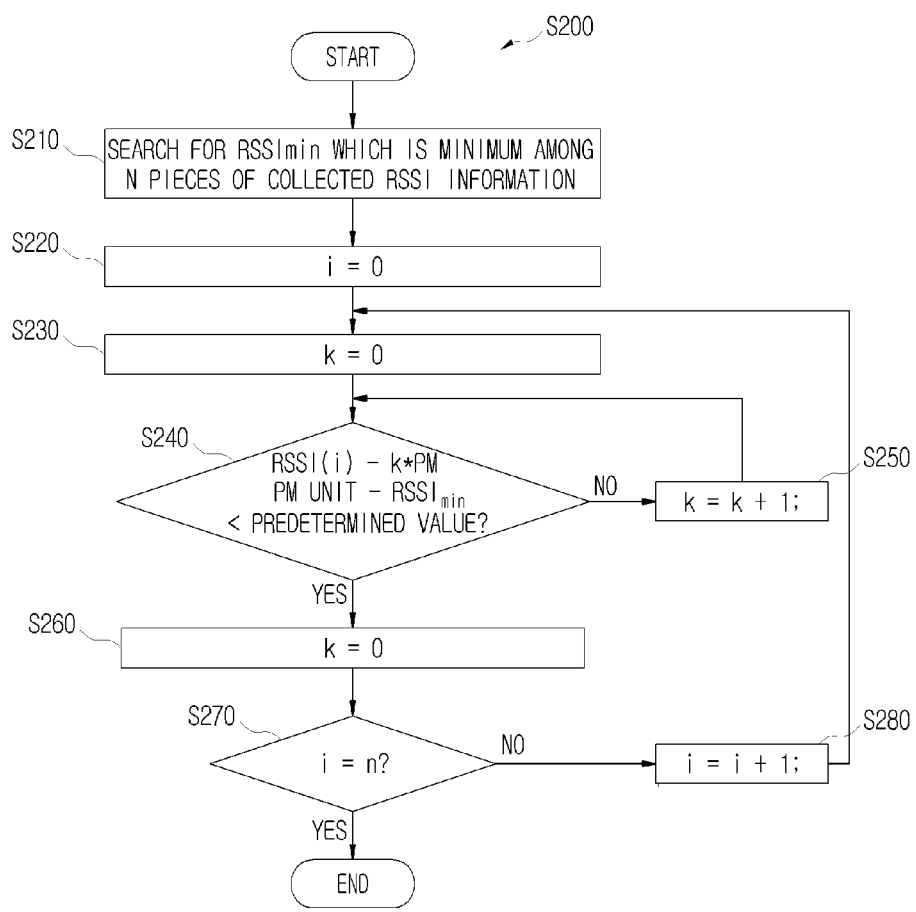
FIG. 6 is a flowchart showing an operation of an ONU power level determiner according to the first exemplary embodiment of the present invention in a method for controlling power of an optical transmitter of an ONU according to exemplary embodiments of the present invention.
Figure 7:
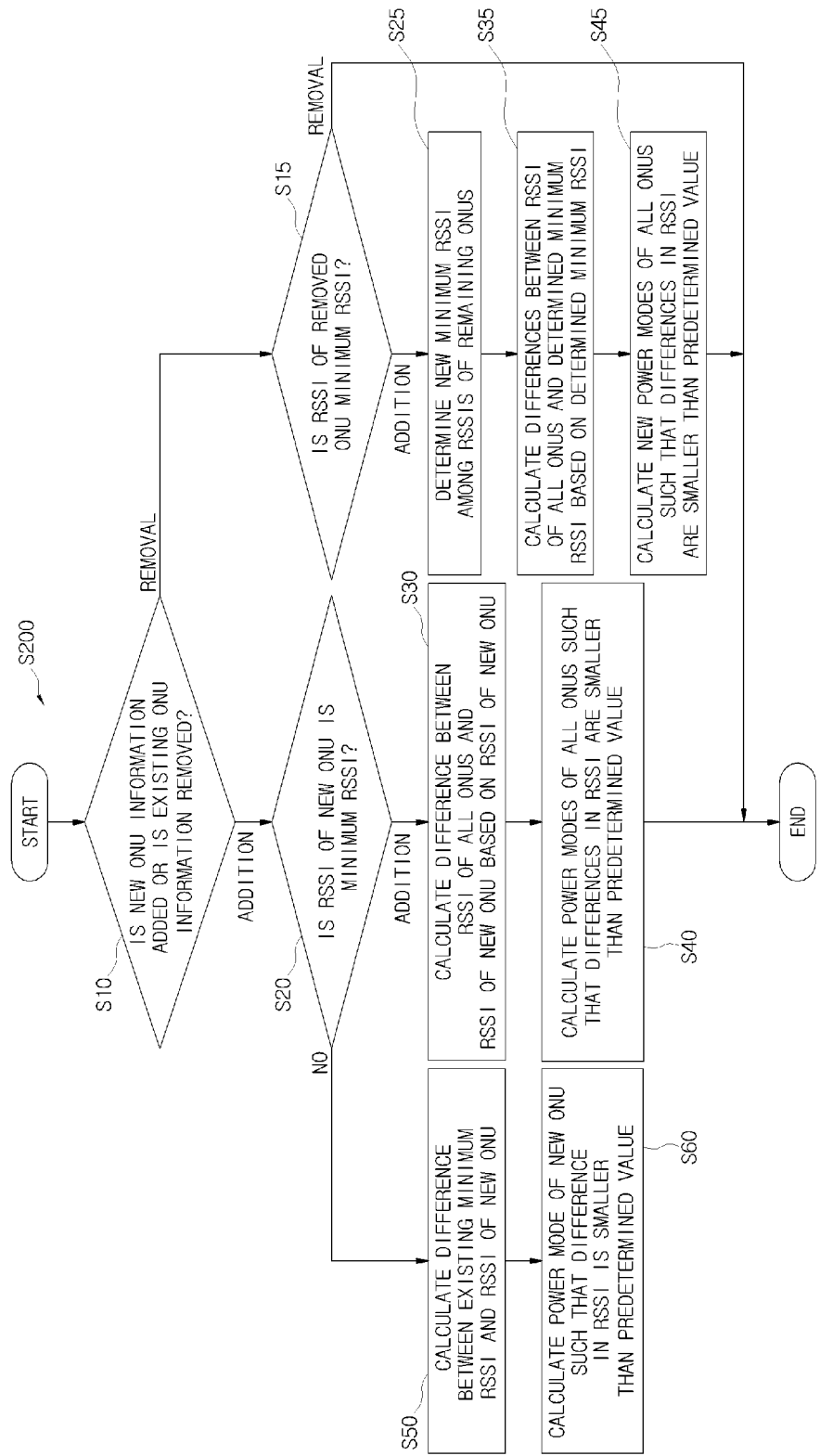
FIG. 7 is a flowchart for describing an operation of an ONU power level determiner according to the second exemplary embodiment of the present invention in a method for controlling power of an optical transmitter of an ONU according to exemplary embodiments of the present invention.

Hereinafter, a process of the ONU power level determiner 20 determining power modes of optical transmitters of ONUs will be described with reference to FIGS. 6 and 7. FIGS. 6 and 7 are flowcharts for describing an operation of an ONU power level determiner according to different exemplary embodiments of the present invention in a method for controlling power of an optical transmitter of an ONU according to exemplary embodiments of the present invention.

Referring to FIG. 6, first, the ONU power level determiner 20 determines a RSSI minimum value $RSSI_{min}$ among the plurality of pieces of collected RSSI information (S210).

Next, the ONU power level determiner 20 compares the RSSI minimum value $RSSI_{min}$ with RSSI values, to calculate a difference between the RSSI minimum value $RSSI_{min}$ and the RSSI values, and compares the calculated difference in RSSI value with a predetermined value (S240).

Meanwhile, FIG. 6 illustrates a process of determining a power mode of an ONU optical transmitter on the assumption that 6 pieces of RSSI information about ONUs are collected. In FIG. 6, a "PM unit" represents a difference in output between power modes, and is assumed to 3 dB in the present specification.

In operation S240, the process of comparing the difference in RSSI value with the predetermined value is sequentially performed starting from the first RSSI value (i=0) to the last RSSI value (i=n−1), and when i=n, the power mode determining process according to exemplary embodiments of the preset invention is finished (S220, S270 and S280).

If it is determined in operation S240 that the difference between an RSSI value RSSI (i) of a specific ONU and the RSSI minimum value is larger than the predetermined value, the ONU power level determiner 20 sequentially increases a power mode value of the corresponding ONU by 1 from an original value k of the power mode value (k=k+1) (S230 and S250).

In this case, the power level determiner 20 sequentially decreases the RSSI value of the corresponding ONU by a PM unit from an original value of the RSSI value. Such an increasing of the power mode and the decreasing of the RSSI value are recursively repeated until the difference in the RSSI value of the ONU is equal to or smaller than the predetermined value.

The ONU power level determiner 20 determines a power mode at a point of time when the difference in the RSSI value of the ONU is equal to or smaller than the predetermined value, as a power mode of the optical transmitter of the ONU (S260).

Tables 2 and 3 represent a process of the ONU power level determiner determining power modes of the ONUs based on the power mode determining method described with reference to FIG. 6.

In detail, Table 2 shows an ONU-ID, a RSSI value, and a difference diff1 from a RSSI minimum with respect to the ONU corresponding to each channel Ch# when the power mode is 0.

TABLE 2

| No. | Ch# | ONU-ID | RSSI(dBm) | diff1 | Power Mode |
|---|---|---|---|---|---|
| 1 | 1 | 1 | −15 | 9 | 0 |
| 2 | 1 | 2 | −14 | 10 | 0 |
| 3 | 2 | 1 | −9 | 15 | 0 |
| 4 | 2 | 2 | −7 | 17 | 0 |
| 5 | 3 | 1 | −20 | 4 | 0 |
| 6 | 3 | 2 | −24 | 0 | 0 |
| 7 | 4 | 1 | −18 | 6 | 0 |

As described above, the RSSI information collected by the RSSI collector 10 includes a channel number identifying the OLT port 100-k, an ONU-ID identifying the ONU 400-n, a measured RSSI value, and current power mode information of the ONU 400-n.

The RSSI collector 10, as shown in Table 2, records the pieces of RSSI information in the order of being collected, and transmits the RSSI information to the ONU power level determiner 20. In this case, it is preferred to record the RSSI value when the ONU is in power mode 0.

For example, when the RSSI measurement is performed during an activation of an ONU, the ONU has a power mode corresponding to an initial setting value, that is, power mode 0. However, if the RSSI measurement is performed during a network operation after the activation of the ONU and power mode setting are finished, the power mode of the ONU included in the RSSI information may not be power mode 0.

For this, the ONU power level determiner 20 may calculate an RSSI value corresponding to power mode 0 using RSSI information transmitted from the RSSI collector 10.

As described above, the RSSI information transmitted from the RSSI collector 10 includes current power mode information of the ONU. Therefore, the ONU power level determiner 20 may infer an RSSI value corresponding to power mode 0 of the ONU.

For example, when received RSSI information is {channel number 1, ONU-ID 1, RSSI −15 dBm, and current power mode 1}, an RSSI value corresponding to power mode 0 of the ONU is inferred as −15 dBm+3 dB=−12 dBm.

The ONU power level determiner 20 determines a RSSI minimum value $RSSI_{min}$ among a plurality of pieces of RSSI information corresponding to when the power modes are 0. In Table 2, an RSSI value corresponding to No. 6, channel 3 and ONU-ID 2 is the lowest value as −24 dBm, and thus determined as the minimum RSSI value $RSSI_{min}$.

Thereafter, the ONU power level determiner 20 calculates a difference between each of the RSSI values of the ONUs and $RSSI_{min}$ (diff1 column).

For example, on the assumption that the size of a predetermined difference is 8 dB, first to fourth ONUs have RSSI value differences 9 dB, 10 dB, 15 dB and 17 dB, respectively, thus exceeding 8 dB. Accordingly, there is a need to reduce the difference range by adjusting the powers of the optical transmitters of the first to fourth ONUs.

According to the power control system in accordance with the present invention, the first to fourth ONUs are determined to have the power modes 1, 1, 3 and 3, respectively, as shown in Table 3, and expected to have RSSI differences of 6 dB, 7 dB, 6 dB and 8 dB, respectively, (see column diff2), so that the RSSI differences are lower than or equal to 8 dB.

TABLE 3

| No. | Ch# | ONU-ID | RSSI(dBm) | diff2 | Power Mode |
|---|---|---|---|---|---|
| 1 | 1 | 1 | −15 | 6 | 1 |
| 2 | 1 | 2 | −14 | 7 | 1 |
| 3 | 2 | 1 | −9 | 6 | 3 |
| 4 | 2 | 2 | −7 | 8 | 3 |
| 5 | 3 | 1 | −20 | 4 | 0 |
| 6 | 3 | 2 | −24 | 0 | 0 |
| 7 | 4 | 1 | −18 | 6 | 0 |

Meanwhile, during an operation of the TWDM-PON system, a new ONU may be activated, or one of the activated ONUs may be removed. FIG. 7 is a flowchart for describing an operation of the ONU power level determiner when a new ONU is activated or an existing ONU is removed.

The power level determiner 20, when there is an ONU which is newly activated (S10), determines whether an RSSI value of the ONU which is newly activated is a new RSSI minimum $RSSI_{min}$ (S20).

When it is determined that the RSSI value of the ONU which is newly activated is a minimum, the ONU power level determiner 20 calculates differences between RSSI values and the RSSI value of the ONU which is newly activated (S30).

Thereafter, the ONU power level determiner 20 updates a power mode of an ONU whose RSSI value difference is calculated to be larger than the predetermined value using the method described with reference to FIG. 6 (S40).

When it is determined in operation S20 that the RSSI value of the ONU which is newly activated is not a minimum, the ONU power level determiner 20 calculates a difference between the existing RSSI minimum value and the new RSSI value (S50), and when the difference is larger than the predetermined value, updates a power mode of an ONU whose difference is larger than the predetermined value using the method described with reference to FIG. 6 (S60).

Meanwhile, some of ONUs which are previously activated may be removed (S10). In this case, the ONU power level determiner 20 may determine whether an RSSI value of the removed ONU is a RSSI minimum value $RSSI_{min}$ (S15).

The ONU power level determiner 20 determines, when it is determined that the RSSI value of the removed ONU is the RSSI minimum value, a new RSSI minimum value $RSSI_{min}$ among RSSI values of the ONUs remaining after the ONU is removed (S25).

Thereafter, the ONU power level determiner 20 calculates differences between RSSI values and the new RSSI minimum value $RSSI_{min}$ (S35).

Thereafter, the ONU power level determiner 20 updates a power mode of an ONU whose RSSI value difference is larger than the predetermined value using the method described with reference to FIG. 6 (S45).

According to exemplary embodiments of the present invention, it is determined whether to update power modes of all of the ONUs or whether to determine a power mode of only a ONU which is newly activated and finish the operation, depending on whether an RSSI value of the ONU which is newly activated is a RSSI minimum value.

Similarly, it is determined whether to check a new RSSI minimum value among RSSI values of the remaining ONUs and update power modes of all of the ONUs, or whether to maintain the original value and finish the operation, depending on whether an RSSI value of a removed ONU is $RSSI_{min}$.

Referring again to FIG. 4, the pieces of power mode setting information about the ONUs determined by the ONU power level determiner 20 are transmitted to the power mode controller 30 of the OLT port 100-k. In this case, the power mode setting information includes a channel number, an ONU-ID, and information about a power mode to which change is made.

The power mode controller 30 generates a physical layer operation and maintenance (PLOAM) message to control a power mode of the ONU based on the received power mode setting information, and transmits the generated PLOAM message to the framing block 40.

The PLOAM message is sent to the ONU while being included in a downstream frame through the framing block 40, and each ONU (in detail, the optical transmitter of each ONU) receives the PLOAM message and changes the power mode thereof.

FIG. 8 is a diagram illustrating an example of details of a PLOAM message according to exemplary embodiments of the present invention. FIG. 8 illustrates Change_Power_Level PLOAM message specifications generated by the power mode controller 30 to instruct a power mode change of an ONU.

Referring to FIG. 8, the Change_Power_Level PLOAM message includes ONU-ID information identifying an ONU, and power mode setting information instructing power mode change, and the above-described five power modes are represented in 3 bits.

Meanwhile, the ONUs 400-1, 400-2, . . . , and 400-n having received a Change_Power_Level PLOAM message changes the power setting of the optical transmitter into a received power mode.

According to an exemplary embodiment, the ONUs 400-1, 400-2, . . . , and 400-n record bias current setting values and modulation current setting values for power modes in processes of optical modules thereof, and if a change to a certain power mode is instructed, the ONUs 400-1, 400-2, . . . , and 400-n change a bias current and modulation currents to the setting values corresponding to the instruction, thereby setting output powers of the optical transmitters.

According to another exemplary embodiment, a variable optical attenuator may be added so that the intensity of output light is adjusted through the variable optical attenuator.

FIG. 5 is a flowchart showing a method for controlling power of an optical transmitter of an ONU according to another exemplary embodiment of the present invention.

Referring to FIG. 5, a method for controlling power of an optical transmitter of an ONU according to another exemplary embodiment of the present invention includes: collecting received signal strength indication (RSSI) information from upstream optical signals received from ONUs connected to optical line terminal (OLT) ports (S100); gathering the pieces of the RSSI information about the ONUs from the OLT port, and determining power of optical transmitters of the ONUs based on the gathered information (S200); transmitting determined power mode setting information of the optical transmitters of the ONUs to the OLT ports (S300); and generating a physical layer operation and maintenance (PLOAM) message to control power modes of the ONUs based on the power mode setting information of the optical transmitter, and transmitting the PLOAM message to the ONUs from the OLT ports (S400).

As described above, the output power level of an ONU optical transmitter is effectively determined and set in the TWDM-PON system. Accordingly, the quality degradation of upstream signal and the power loss due to the inter-channel crosstalk can be reduced.

As is apparent from the above, according to the present invention, a wavelength demultiplexer of a front end of an OLT port can determine and control output power of an optical transmitter of an ONU of each channel such that a magnitude of an optical signal received from the ONU is limited within a certain range, thereby reducing quality degradation and power penalty in upstream transmission of the ONU due to crosstalk between the channels.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A system for determining and controlling power of an optical transmitter of an optical network unit (ONU) provided for a time and wavelength division multiplexing passive optical network (TWDM-PON) system, the TWDM-PON system having a plurality of ONUs including the ONU, and a plurality of optical line terminals (OLTs) corresponding to the plurality of ONUs, each OLT having an OLT port to which a corresponding one of the ONUs is connected, the system comprising:
    an RSSI collector configured to collect received signal strength indication (RSSI) information from upstream optical signals received from the ONUs connected to the OLT ports;
    an ONU power level determiner configured to gather pieces of RSSI information about the ONUs from the RSSI collector, and to determine power of optical transmitters of the ONUs based on the gathered information; and
    a power mode controller configured to receive power mode setting information of the optical transmitters of the ONUs from the ONU power level determiner, and to generate a physical layer operation and maintenance (PLOAM) message to control power modes of the ONUs based on the received power mode setting information, wherein
    the RSSI collector and the power mode controller are implemented inside each of the OLT ports, and the ONU power level determiner is implemented outside each of the OLT ports, and
    the RSSI information includes a channel number identifying an OLT port, an ONU-ID (identification) identifying the ONU, a measured RSSI value, and current power mode information of the ONU.

2. The system of claim 1, wherein the RSSI collector is configured to collect RSSI information for each of the ONUs connected to the OLTs using an RSSI measurement function of an OLT optical module provided for the OLT port.

3. The system of claim 2, wherein the RSSI collector sends a trigger signal for RSSI measurement to the OLT optical module at a time of arrival of a burst frame of each ONU received upstream, and predicts an arrival interval of an upstream burst frame for each of the ONUs using an upstream bandwidth map BWmap generated in a framing block provided for the OLT port.

4. The system of claim 2, wherein the RSSI collector predicts a time of arrival of an upstream burst frame for each of the ONUs using a signal detect signal about an upstream burst output by the OLT optical module in a ranging process performed during activation of the ONU.

5. The system of claim 1, wherein the ONU power level determiner determines a RSSI minimum value ($RSSI_{min}$) among the plurality of pieces of collected RSSI information, and determines a power mode of the optical transmitter of each of the ONUs such that a difference between the RSSI minimum value and the RSSI values is equal to or lower than a predetermined value.

6. The system of claim 5, wherein the ONU power level determiner compares a first difference between the RSSI minimum value ($RSSI_{min}$) and an RSSI value of a first ONU with the predetermined value,
    if the first difference is larger than the predetermined value, sequentially increases a power mode value of an optical transmitter of the first ONU by a predetermined unit size from an original value of the power mode value; and
    sequentially decreases the RSSI value of the first ONU by a predetermined unit size from an original value of the RSSI value of the first ONU,
    wherein the sequential increasing of the power mode value of the optical transmitter of the first ONU and the sequential decreasing of the RSSI value of the first ONU are recursively repeated until the first difference between the RSSI minimum value ($RSSI_{min}$) and the RSSI value of the first ONU is equal to or smaller than the predetermined value.

7. The system of claim 6, wherein the power mode value of the optical transmitter of the first ONU is determined to a power mode value at a point of time at which a difference between the RSSI minimum value ($RSSI_{min}$) and the RSSI value of the first ONU is equal to or smaller than the predetermined value.

8. The system of claim 1, wherein the power level determiner determines, when there is a second ONU which is newly activated, whether an RSSI value of the second ONU is a new RSSI minimum value ($RSSI_{min}$),
    calculates, when it is determined that the RSSI value of the second ONU is a minimum, differences between the RSSI value of the second ONU and RSSI values based on the RSSI value of the second ONU, and
    determines a power mode of the optical transmitters of the ONUs such that the differences between the RSSI value of the second ONU and the RSSIs are equal to or smaller than a predetermined value.

9. The system of claim 1, wherein the ONU power level determiner determines, when there is a third ONU to be removed exists among ONUs which are previously activated, whether an RSSI value of the third ONU is a new RSSI minimum value ($RSSI_{min}$), and
    determines, when it is determined that the RSSI value of the third ONU is a minimum, a new RSSI minimum value ($RSSI_{min}$) among the remaining ONUs, and determines power modes of the optical transmitters of the ONUs such that differences between the new RSSI minimum value and RSSI values are equal to or smaller than a predetermined value.

10. The system of claim 1, wherein the power mode setting information includes a channel number, an ONU-ID, and information about a power mode to be changed.

11. A method of determining and controlling power of an optical transmitter of an optical network unit (ONU) provided for a time and wavelength division multiplexing passive optical network (TWDM-PON) system, the TWDM-PON system having a plurality of ONUs including the ONU, and a plurality of optical line terminals (OLTs) corresponding to the plurality of ONUs, each OLT having an OLT port to which a corresponding one of the ONUs is connected, the method comprising:
  collecting received signal strength indication (RSSI) information from upstream optical signals received from the ONUs connected to the OLT ports;
  gathering pieces of RSSI information about the ONUs from the OLT ports, and determining power of optical transmitters of the ONUs based on the gathered information;
  transmitting determined power mode setting information of the optical transmitters of the ONUs to the OLT ports; and
  generating a physical layer operation and maintenance (PLOAM) message which contains directed or broadcast ONU-ID (identification), power mode control information in a specific power mode or attenuation level, to control power modes of the ONUs based on the power mode setting information of the optical transmitter, and transmitting the PLOAM message to the ONUs from the OLT ports, wherein
  the collecting is performed by an RSSI collector implemented inside each of the OLT ports,
  the generating is performed by a power mode controller implemented inside each of the OLT ports,
  the gathering and determining are performed by an ONU power level determiner implemented outside each of the OLT ports, and
  the RSSI information includes a channel number identifying an OLT port, an ONU-ID identifying the ONU, a measured RSSI value, and current power mode information of the ONU.

12. The method of claim 11, wherein the determining of the power of the optical transmitters of the ONUs comprises determining a RSSI minimum value ($RSSI_{min}$) among the plurality of pieces of collected RSSI information, and determining power modes of the optical transmitters of the ONUs such that differences between the RSSI minimum value and the RSSI values are equal to or lower than a predetermined value.

13. The method of claim 12, wherein the determining of the power of the optical transmitters of the ONUs comprises:
  (a) comparing a first difference between the RSSI minimum value ($RSSI_{min}$) and an RSSI value of a first ONU with the predetermined value;
  (b) if the first difference is larger than the predetermined value, sequentially increasing a power mode value of an optical transmitter of the first ONU by a predetermined unit size from an original value of the power mode value; and
  (c) sequentially decreasing the RSSI value of the first ONU by a predetermined unit size from an original value of the RSSI value,
  wherein (a) to (c) are recursively repeated until the first difference between the RSSI minimum value ($RSSI_{min}$) and the RSSI value of the first ONU is equal to or smaller than the predetermined value.

14. The method of claim 13, wherein the determining of the power of the optical transmitters of the ONUs comprises determining the power mode value of the optical transmitter of the first ONU as a power mode value at a point of time at which a difference between the RSSI minimum value ($RSSI_{min}$) and the RSSI value of the first ONU is equal to or smaller than the predetermined value.

15. The method of claim 12, wherein the determining of the power of the optical transmitters of the ONUs comprises:
  determining, when there is a second ONU which is newly activated, whether an RSSI value of the second ONU is a new RSSI minimum value ($RSSI_{min}$),
  calculating, when it is determined that the RSSI value of the second ONU is a minimum, differences between the RSSI value of the second ONU and RSSI values based on the RSSI value of the second ONU, and
  determining a power mode of the optical transmitters of the ONUs such that the difference between the RSSI value of the second ONU and the RSSIs are equal to or smaller than a predetermined value.

16. The method of claim 12, wherein the determining of the power of the optical transmitters of the ONUs comprises:
  determining, when there is a third ONU to be removed exists among ONUs which are previously activated, whether an RSSI value of the third ONU is a new RSSI minimum value ($RSSI_{min}$),
  determining, when it is determined that the RSSI value of the third ONU is a minimum, a new RSSI minimum value ($RSSI_{min}$) among the remaining ONUs, and
  determining power modes of the optical transmitters of the ONUs such that differences between the new RSSI minimum value and RSSI values are equal to or smaller than a predetermined value.

* * * * *